United States Patent
Ohnishi

(10) Patent No.: US 8,521,224 B2
(45) Date of Patent: Aug. 27, 2013

(54) COMMUNICATION SYSTEM, INTERNAL LINE MANAGING APPARATUS, INTERNAL PHONE MANAGEMENT METHOD, AND NON-TRANSITORY COMPUTER READABLE STORAGE MEDIUM

(75) Inventor: Yoshiaki Ohnishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 202 days.

(21) Appl. No.: 13/064,095

(22) Filed: Mar. 4, 2011

(65) Prior Publication Data
US 2011/0294480 A1 Dec. 1, 2011

(30) Foreign Application Priority Data
May 31, 2010 (JP) .................................. 2010-124575

(51) Int. Cl.
*H04M 1/00* (2006.01)
*H04M 3/42* (2006.01)
*H04M 7/00* (2006.01)

(52) U.S. Cl.
USPC ..................... 455/554.1; 455/417; 455/554.2; 455/555; 379/211.02; 379/231

(58) Field of Classification Search
USPC ........................................................ 455/417
See application file for complete search history.

(56) References Cited

U.S. PATENT DOCUMENTS
7,127,263 B1 * 10/2006 Ihara .............................. 455/465
7,991,393 B1 * 8/2011 Cook et al. ................. 455/426.2

FOREIGN PATENT DOCUMENTS
| JP | 06-350522 | 12/1994 |
| JP | 2001-268277 | 9/2001 |

\* cited by examiner

*Primary Examiner* — Huy C Ho
(74) *Attorney, Agent, or Firm* — Staas & Halsey LLP

(57) ABSTRACT

If an internal line call request is received with respect to a mobile phone that is in a call connection and that is used as an internal phone, the internal line call request is forwarded to a mobile management apparatus. If a called party's mobile phone that makes the internal line call request is in a call connection, the mobile management apparatus provides the same supplementary service as that is provided when a call request is received with respect to a mobile terminal in a call using a mobile phone number.

5 Claims, 13 Drawing Sheets

| MOBILE PHONE NUMBER | TENANT | INTERNAL PHONE NUMBER |
|---|---|---|
| 090-A | 1 | 1001 |
| 090-B | 1 | 1002 |
| 090-C | 1 | 2001 |
| 090-D | 2 | 4001 |
| 090-E | 2 | 5001 |

| TENANT | INTERNAL PHONE NUMBER | PROVIDING SUBJECT | CALL STATUS |
|---|---|---|---|
| 1 | 1001 | INTERNAL LINE PARTY | AVAILABLE |
| 1 | 1002 | MOBILE PHONE PARTY | BUSY |
| 1 | 2001 | MOBILE PHONE PARTY | AVAILABLE |
| 2 | 4001 | MOBILE PHONE PARTY | BUSY |
| 2 | 5001 | INTERNAL LINE PARTY | BUSY |

COMMUNICATION SYSTEM, INTERNAL LINE MANAGING APPARATUS, INTERNAL PHONE MANAGEMENT METHOD, AND NON-TRANSITORY COMPUTER READABLE STORAGE MEDIUM

CROSS-REFERENCE TO RELATED APPLICATION

This application is based upon and claims the benefit of priority of the prior Japanese Patent Application No. 2010-124575, filed on May 31, 2010, the entire contents of which are incorporated herein by reference.

FIELD

The embodiments discussed herein are directed to a communication system, an internal line managing apparatus, an internal phone management method, and a non-transitory computer readable storage medium.

BACKGROUND

In recent years, internal phone services in which mobile terminals, such as mobile phones, are used as internal company phones have been provided by telecommunications carriers. In general, in addition to a general mobile phone number, an internal phone number that is different from the general mobile phone number and that is used for an internal phone is assigned to such a mobile terminal that can use the internal phone service. By performing a call request operation using the internal phone number, a mobile terminal user can make a call using the internal phone without locating to a specific area in, for example, a company.

A communication system that implements such an internal phone service includes, for example, a mobile phone system that controls communication between mobile terminals and an internal phone system that controls communication between mobile terminals that are used as internal phones. In the mobile phone system, when an internal line call request including an internal phone number is received, the internal line call request is transmitted to an internal phone system. When the internal line call request is received from the mobile phone system, the internal phone system makes a call connection between the source mobile terminal that made the internal line call request and the called party's mobile terminal. By doing so, users of both mobile terminals can conduct an internal phone call.

Furthermore, if a call request is received with respect to a mobile terminal that is in a call, the mobile phone system provides a supplementary service, such as a voice mail service or a forwarding service that forwards an incoming call. Furthermore, if an internal line call request is received with respect to a mobile terminal that is in an internal phone call, the internal phone system provides a supplementary service, such as a voice mail service.

Patent Document 1: Japanese Laid-open Patent Publication No. 06-350522
Patent Document 2: Japanese Laid-open Patent Publication No. 2001-268227

However, with the technologies disclosed in the above Patent Documents described above, there is a problem in that, in some cases, the supplementary service may not be provided by the mobile phone system. For example, if the internal line call request with respect to the mobile terminal that is subjected to a call connection performed by the internal phone system, the supplementary service is not provided by the mobile phone system. Such a problem will be specifically described with reference to FIG. 14. FIG. 14 is a schematic diagram illustrating an example configuration of a conventional communication system.

As illustrated in FIG. 14, a conventional communication system 9 includes mobile management apparatuses 20 and 30 and an internal line managing apparatus 900. The mobile management apparatuses 20 and 30 control communication of a mobile phone 11 or a mobile phone 12. The mobile management apparatuses 20 and 30 are mobile phone systems each including a higher-level device, such as a base station or a base station control device. The internal line managing apparatus 900 is connected to the mobile management apparatuses 20 and 30 in a wired or wireless manner. The internal line managing apparatus 900 is an internal phone system that controls communication of the mobile phone 11 or the like when the mobile phone 11 is used as an internal phone.

With this configuration, in the example illustrated in FIG. 14, suppose that the mobile phone 11 and the mobile phone 12 are used as internal phones and are in a call connection (Step S91). In other words, suppose that the mobile phone 11 and the mobile phone 12 are subjected in a call connection performed by the internal line managing apparatus 900. In this state, as in the example illustrated in FIG. 14, a mobile phone 13 transmits, to the mobile management apparatus 30, an internal line call request for an internal phone call with the mobile phone 11 (Step S92). The mobile management apparatus 30 transmits the internal line call request received from the mobile phone 13 to the internal line managing apparatus 900 (Step S93).

Then, if the internal line call request is received from the mobile management apparatus 30, the internal line managing apparatus 900 determines whether the mobile phone 11, which is a called party, is in a call connection. In this case, because the mobile phone 11 and the mobile phone 12 are in a call connection, the internal line managing apparatus 900 provides the supplementary service. For example, the internal line managing apparatus 900 notifies, via the mobile management apparatus 30, the mobile phone 13 of a voice mail guidance (Steps S94 and S95).

In this way, if an internal line call request is transmitted to the mobile phone 11 that is subjected to a call connection performed by the internal line managing apparatus 900, the supplementary service is provided by the internal line managing apparatus 900. In other words, if a user of, for example, the mobile phone 11 receives an internal phone call from another mobile phone while the user is conducting an internal phone call, the user may not receive the supplementary service provided by the mobile management apparatus 20. There may be a case in which the supplementary service provided by the mobile management apparatus 20 or 30 is better than the supplementary service provided by the internal line managing apparatus 900. Accordingly, some users may want to receive supplementary service provided by the mobile management apparatus 20 or 30.

SUMMARY

According to an aspect of an embodiment of the invention, a communication system includes a call control unit that performs, when an internal line call request for communication using an internal phone number is received from a mobile terminal to which a mobile phone number and the internal phone number that is different from the mobile phone number are assigned, a call connection between the source mobile terminal that makes the internal line call request and a called party's mobile terminal, and a forwarding unit that forwards, when the internal line call request is received with respect to the mobile terminal that is subjected to the call connection performed by the call control unit, the internal line call request to the mobile management apparatus, and the mobile management apparatus includes a mobile-party service providing unit that provides, when the internal line call request is received from the forwarding unit, a supplementary service that is provided when a call request is received with respect to the mobile terminal that is in a call using the mobile phone number.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a schematic diagram illustrating an example of a phone number storing unit according to the second embodiment;

FIG. 6 is a schematic diagram illustrating an example of a user information storing unit according to the second embodiment;

DESCRIPTION OF EMBODIMENTS

Preferred embodiments of the present invention will be explained with reference to accompanying drawings. The embodiments are not limited to a communication system, an internal line managing apparatus, an internal phone management method, and a non-transitory computer readable storage medium disclosed in the present invention.

[a] First Embodiment

Figure 1:
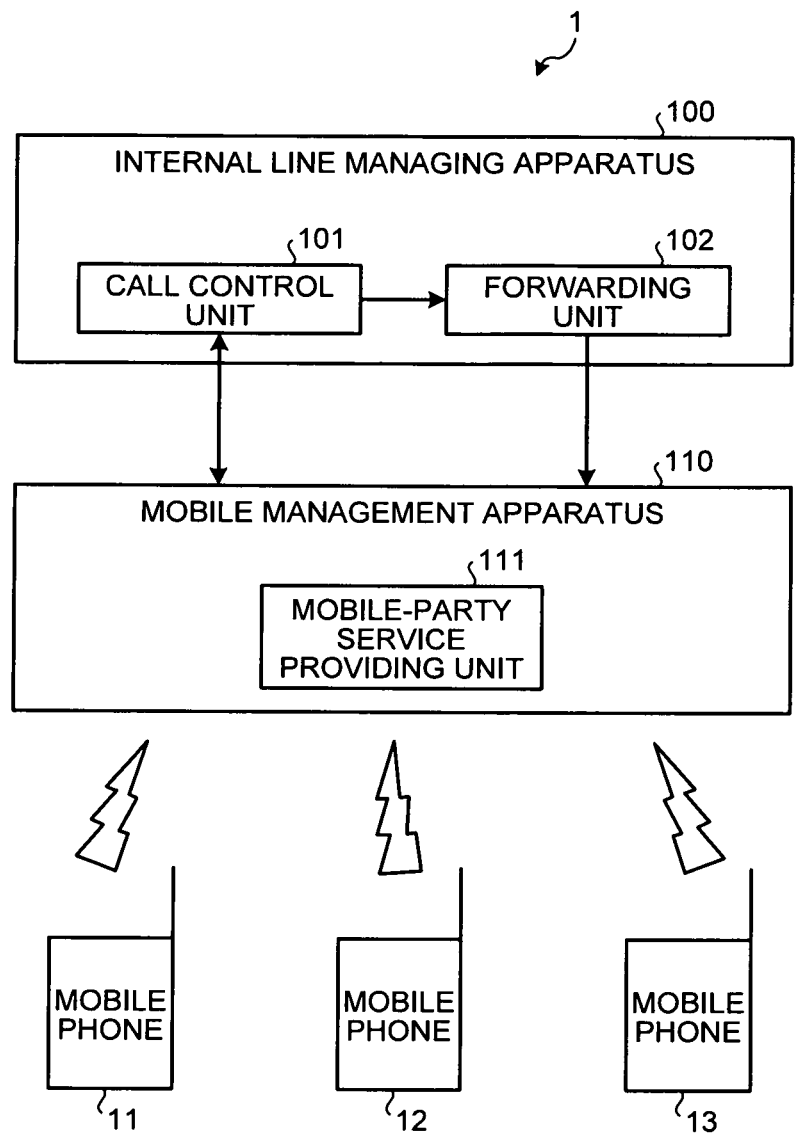
FIG. 1 is a block diagram illustrating an example configuration of a communication system according to a first embodiment.

First, the communication system according to a first embodiment will be described with reference to FIG. 1. FIG. 1 is a block diagram illustrating an example configuration of the communication system according to the first embodiment. As illustrated in FIG. 1, a communication system 1 according to the first embodiment includes an internal line managing apparatus 100 and a mobile management apparatus 110. The internal line managing apparatus 100 controls communication performed among mobile phones 11 to 13 via the mobile management apparatus 110. The mobile management apparatus 110 controls the communication performed among the mobile phones 11 to 13.

In the example illustrated in FIG. 1, suppose that the mobile phones 11 to 13 support an internal phone service. Specifically, in addition to a mobile phone number, an internal phone number that is different from its mobile phone number and that is used for an internal phone process is assigned to each of the mobile phones 11 to 13.

As illustrated in FIG. 1, the internal line managing apparatus 100 includes a call control unit 101 and a forwarding unit 102. If an internal line call request for a call using an internal phone number is received from, for example, the mobile phone 11 via the mobile management apparatus 110, the call control unit 101 makes a call connection between a source mobile terminal that made the internal line call request and a called party's mobile terminal. For example, if the call control unit 101 receives, from the mobile phone 11, an internal line call request for an internal phone call with the mobile phone 12, the call control unit 101 makes a call connection between the mobile phone 11 that is the source party and the mobile phone 12 that is the called party.

If the forwarding unit 102 receives an internal line call request with respect to, for example, the mobile phone 11 that is subjected to a call connection performed by the call control unit 101, the forwarding unit 102 forwards the internal line call request to the mobile management apparatus 110. For example, as in the example described above, suppose that the mobile phone 11 and the mobile phone 12 are subjected to call connection performed by the call control unit 101. In such a case, if the forwarding unit 102 receives, for example, from the mobile phone 13, an internal line call request with respect to the mobile phone 11 that is in a call connection, the forwarding unit 102 forwards the internal line call request to the mobile management apparatus 110.

As illustrated in FIG. 1, the mobile management apparatus 110 includes a mobile-party service providing unit 111. If the mobile-party service providing unit 111 receives an internal line call request from the forwarding unit 102 in the internal line managing apparatus 100, the mobile-party service providing unit 111 provides a supplementary service. Specifically, the mobile-party service providing unit 111 provides the same supplementary service provided when a call request is received with respect to a mobile terminal in a call using a mobile phone number.

The internal line managing apparatus 100 illustrated in FIG. 1 can be an internal phone system that includes multiple devices. Such an internal phone system implements the same function as that performed by the internal line managing apparatus 100. Furthermore, the mobile management apparatus 110 illustrated in FIG. 1 can be a mobile phone system that includes multiple devices. Such a mobile phone system implements the same function as that performed by the internal line managing apparatus 100.

Figure 2:
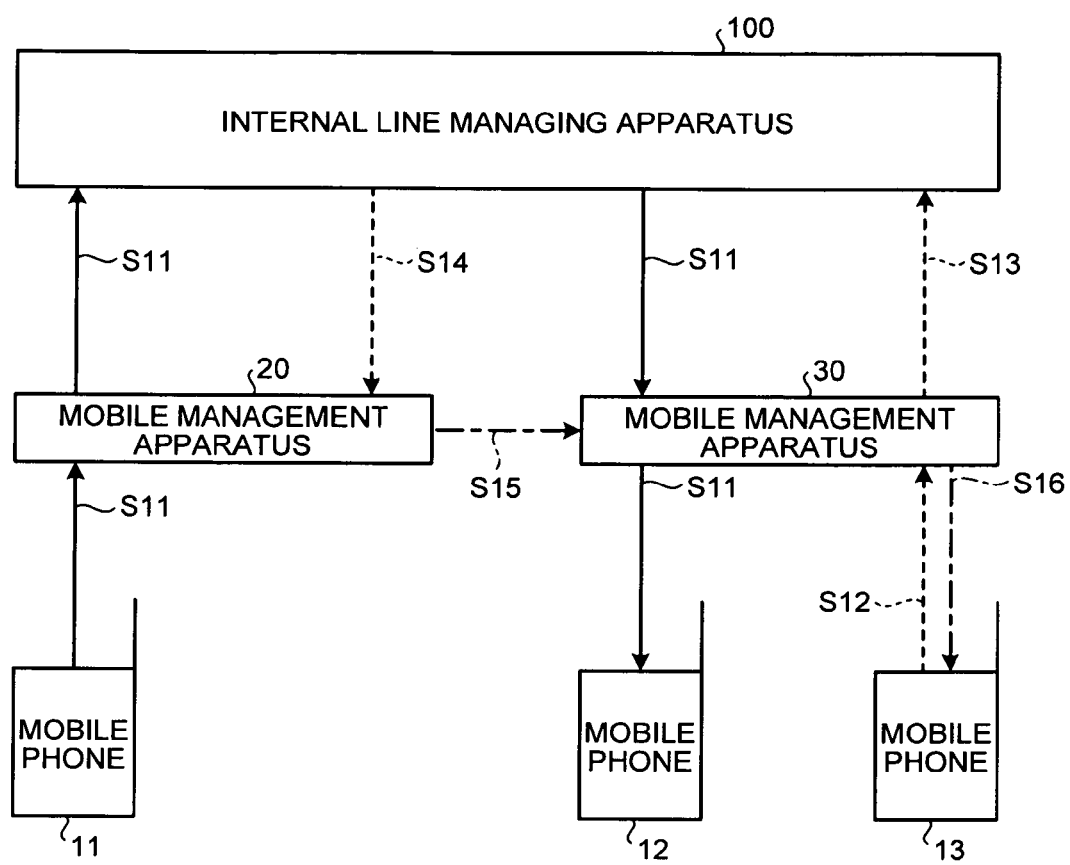
FIG. 2 is a schematic diagram illustrating an example of an internal phone management process performed by the communication system according to the first embodiment.

In the following, an internal phone management process performed by the communication system 1 according to the first embodiment will be described with reference to FIG. 2. FIG. 2 is a schematic diagram illustrating an example of an internal phone management process performed by the communication system 1 according to the first embodiment. Mobile management apparatuses 20 and 30 illustrated in FIG. 2 correspond to the mobile management apparatus 110 illustrated in FIG. 1. In the example illustrated in FIG. 2, suppose that the mobile phone 11 and the mobile phone 12 are in a call connection using the call control unit 101 in the internal line managing apparatus 100 (Step S11). In other words, suppose that the mobile phone 11 and the mobile phone 12 are used as internal phones and are in a call connection.

In this state, as in the example illustrated in FIG. 2, the mobile phone 13 transmits, to the mobile management apparatus 30, an internal line call request for an internal phone call with the mobile phone 11 (Step S12). Because the internal line call request received from the mobile phone 13 is a call request using an internal phone, the mobile management apparatus 30 transmits that internal line call request to the internal line managing apparatus 100 (Step S13).

If the internal line managing apparatus 100 receives an internal line call request from the mobile management apparatus 30, the internal line managing apparatus 100 forwards the internal line call request to the mobile management apparatus 20 even when the mobile phone 11 that is a called party is in a call connection (Step S14). The reason for the internal line managing apparatus 100 forwarding the internal line call request to the mobile management apparatus 20 is that the wireless communication target for the mobile phone 11 that is the called party is the mobile management apparatus 20.

Then, the mobile management apparatus 20 determines whether the mobile phone 11 that is the called party is in a call connection. In this case, the mobile management apparatus 20 determines that the mobile phone 11 is in a call connection and provides a supplementary service. Specifically, the mobile management apparatus 20 provides the same supplementary service provided when the mobile management apparatus 20 receives a call request with respect to the mobile phone 11 that is subjected to a call connection performed by a mobile phone number. For example, the mobile management apparatus 20 provides the supplementary service, such as a voice mail service or a forwarding service, via the mobile management apparatus 30 (Steps S15 and S16).

As described above, in the communication system 1 according to the first embodiment, even if the internal line managing apparatus 100 receives an internal line call request with respect to a mobile phone in a call connection, the internal line managing apparatus 100 forwards the internal line call request to the mobile management apparatus 20 or 30. Then, if a called party's mobile phone that is the destination of the internal line call request is in a call connection, the mobile management apparatus 20 or 30 provides a supplementary service. Accordingly, even if the communication system 1 according to the first embodiment receives an internal line call request with respect to a mobile phone that is subjected to a call connection performed by the internal line managing apparatus 100, the communication system 1 can provide the supplementary service using the mobile management apparatus. Specifically, a mobile phone user receives a supplementary service provided by the mobile management apparatus instead of a supplementary service provided by the internal line managing apparatus.

The communication system 1 described, as an example, in the first embodiment is effective in a case, for example, where the supplementary service provided by the mobile management apparatus is better than the supplementary service provided by the internal line managing apparatus. For example, there may be a case in which a user cannot change voice mail guidance or a case in which the supplementary service provided by the internal line managing apparatus may not support a forwarding service. In contrast, with the supplementary service provided by the internal line managing apparatus, there may be a case in which a user can record voice mail guidance or a case in which the supplementary service may support a forwarding service. In this situation, a user sometimes may request the supplementary service provided by the mobile management apparatus. With the communication system 1 according to the first embodiment, because the supplementary service is provided by the mobile management apparatus, a user can receive the supplementary service provided by the mobile management apparatus.

In the communication system 1 according to the first embodiment, the mobile management apparatuses 20 and 30 need to simply perform the same process as that performed by the conventional mobile management apparatus. Specifically, the mobile management apparatuses 20 and 30 manage whether the mobile phone 11 or the like is in a call connection regardless of whether the mobile phone 11 or the like is used as an internal phone. Accordingly, if the mobile management apparatuses 20 and 30 receive, from the internal line managing apparatus 100, an internal line call request with respect to a mobile phone in a call connection, the mobile management apparatuses 20 and 30 can provide the supplementary service by performing the same process as that performed by the conventional mobile management apparatus. In other words, in the communication system 1 according to the first embodiment, there is no need to change the configuration of the mobile management apparatuses 20 and 30; therefore, it is possible to easily implement the communication system 1.

[b] Second Embodiment

In a second embodiment, a communication system that can select a supplementary service provided by the internal line managing apparatus or a supplementary service provided by the mobile management apparatus will be described.

Configuration of the Communication System
According to the Second Embodiment

Figure 3:
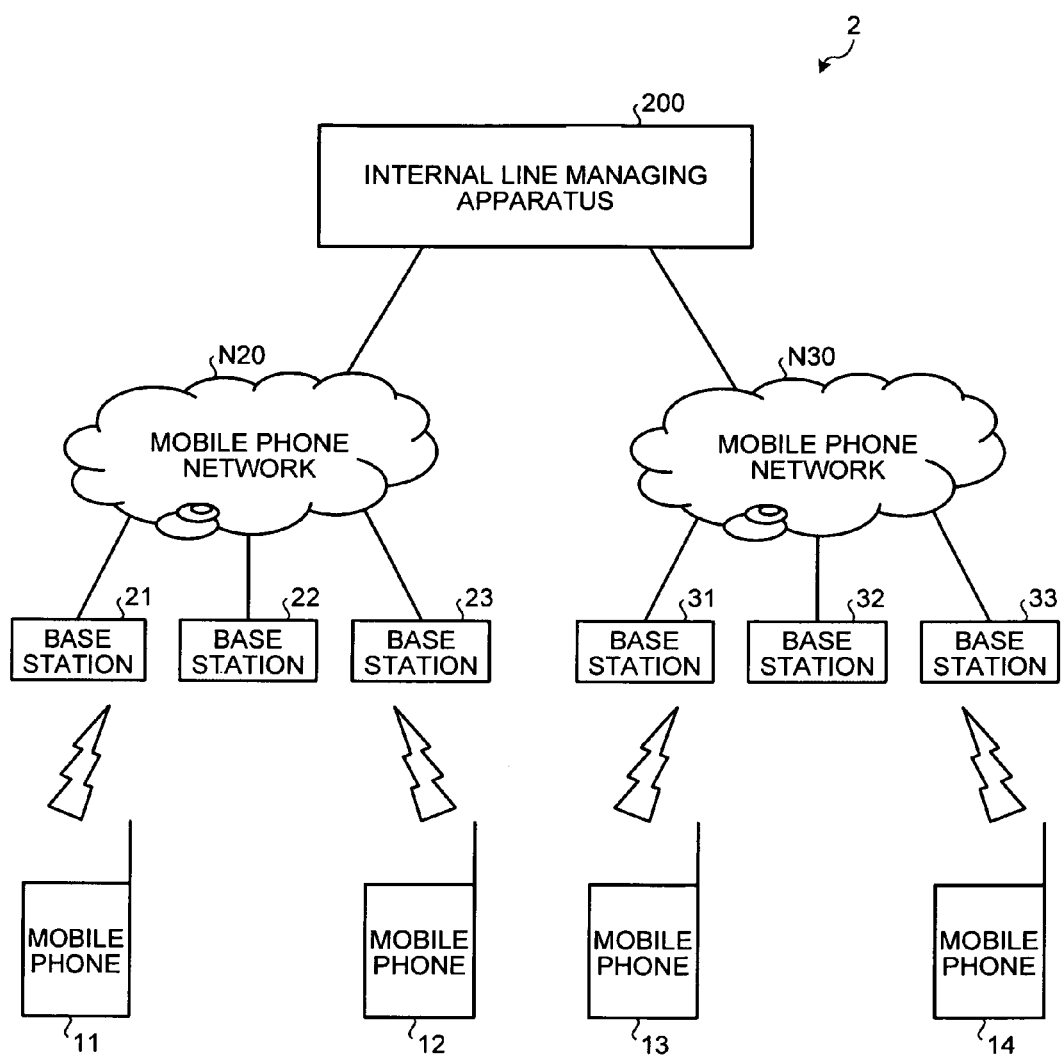
FIG. 3 is a block diagram illustrating an example configuration of a communication system according to a second embodiment.

First, a communication system 2 according to the second embodiment will be described with reference to FIG. 3. FIG. 3 is a block diagram illustrating an example configuration of the communication system 2 according to the second embodiment. As illustrated in FIG. 3, the communication system 2 according to the second embodiment includes base stations 21 to 23, base stations 31 to 33, and an internal line managing apparatus 200.

In the communication system 2 illustrated in FIG. 3, an example case is illustrated in which three base stations 21 to 23 are connected to a mobile phone network N20 and three base stations 31 to 33 are connected to a mobile phone network N30. However, the number of base stations connected to the mobile phone network N20 and the mobile phone network N30 is not limited to the case illustrated in FIG. 3.

The base stations 21 to 23 are connected to the internal line managing apparatus 200 via the mobile phone network N20. The base stations 31 to 33 are connected to the internal line managing apparatus 200 via the mobile phone network N30.

The mobile phone network N20 and the mobile phone network N30 can be provided by a single telecommunications carrier or can be provided by different telecommunications carriers. Specifically, the internal line managing apparatus 200 according to the second embodiment can be connected to multiple mobile phone networks provided by a single telecommunications carrier or can be connected to multiple mobile phone networks provided by different telecommunications carriers.

The base stations 21 to 23 and the base stations 31 to 33 transmit/receive various signals to/from mobile phones 11 to 14 and control communication among the mobile phones 11 to 14. In the example illustrated in FIG. 3, the base station 21 transmits/receives various signals to/from the mobile phone 11, the base station 23 transmits/receives various signals to/from the mobile phone 12, the base station 31 transmits/receives various signals to/from the mobile phone 13, and the base station 33 transmits/receives various signals to/from the mobile phone 14.

Furthermore, either one of the base stations 21 to 23 and the base stations 31 to 33 and a higher-level device, such as a base station control device included in the mobile phone networks N20 and N30, corresponds to, for example, the mobile management apparatus 110 illustrated in FIG. 1 or the mobile management apparatus 20 or 30 illustrated in FIG. 2 and implements the same function as that performed by the mobile management apparatus 20, 30 or 110. Furthermore, for example, the higher-level device and both the base stations 21 to 23 and the base stations 31 to 33 cooperate to implement the same function as that is performed by the mobile management apparatus 110 illustrated in FIG. 1.

The internal line managing apparatus 200 controls communication performed among the mobile phones 11 to 14. Specifically, if the mobile phones 11 to 14 are used as internal phones, the internal line managing apparatus 200 controls communication, among the internal phones, performed via the base stations 21 to 23 and the base stations 31 to 33 or the mobile phone networks N20 and N30.

In the example illustrated in FIG. 3, for example, if the mobile phone 11 and the mobile phone 12 perform an incoming call process using mobile phone numbers, the mobile phone 11 transmits a call request to the base station 21. The call request includes, for example, a mobile phone number of the source mobile phone 11 and a mobile phone number of the called party's mobile phone 12. Then, the base station 21 makes a call connection between the mobile phone 11 and the mobile phone 12 via the mobile phone network N20 and the base station 23. In this way, a user of the mobile phone 11 can make a call with a user of the mobile phone 12.

Furthermore, in the example illustrated in FIG. 3, for example, if the mobile phone 11 and the mobile phone 13 perform the incoming call process using the internal phone numbers, the mobile phone 11 transmits an internal line call request to the base station 21. The internal line call request includes, for example, the mobile phone number of the source mobile phone 11 and an internal phone number of the called party's mobile phone 13. Then, the base station 21 transmits the internal line call request to the internal line managing apparatus 200. By using the internal phone number of the mobile phone 13 included in the internal line call request, the internal line managing apparatus 200 makes a call connection between the mobile phone 11 and the mobile phone 13. In this way, a user of the mobile phone 11 can make an internal phone call with a user of the mobile phone 13.

When, as in the example described above, the mobile phone 11 and the mobile phone 13 are in the internal phone call, there may be a case in which the mobile phone 12, the mobile phone 14, or the like transmits an internal line call request to the mobile phone 11. In such a case, in the communication system 2 according to the second embodiment, a supplementary service is provided by the internal line managing apparatus 200 in the mobile phone network N20 selected by a user. Accordingly, in the communication system 2 according to the second embodiment, it is possible to provide the supplementary service by either one of the internal line managing apparatus 200 or the mobile phone network N20 desired by a user.

Figure 4:
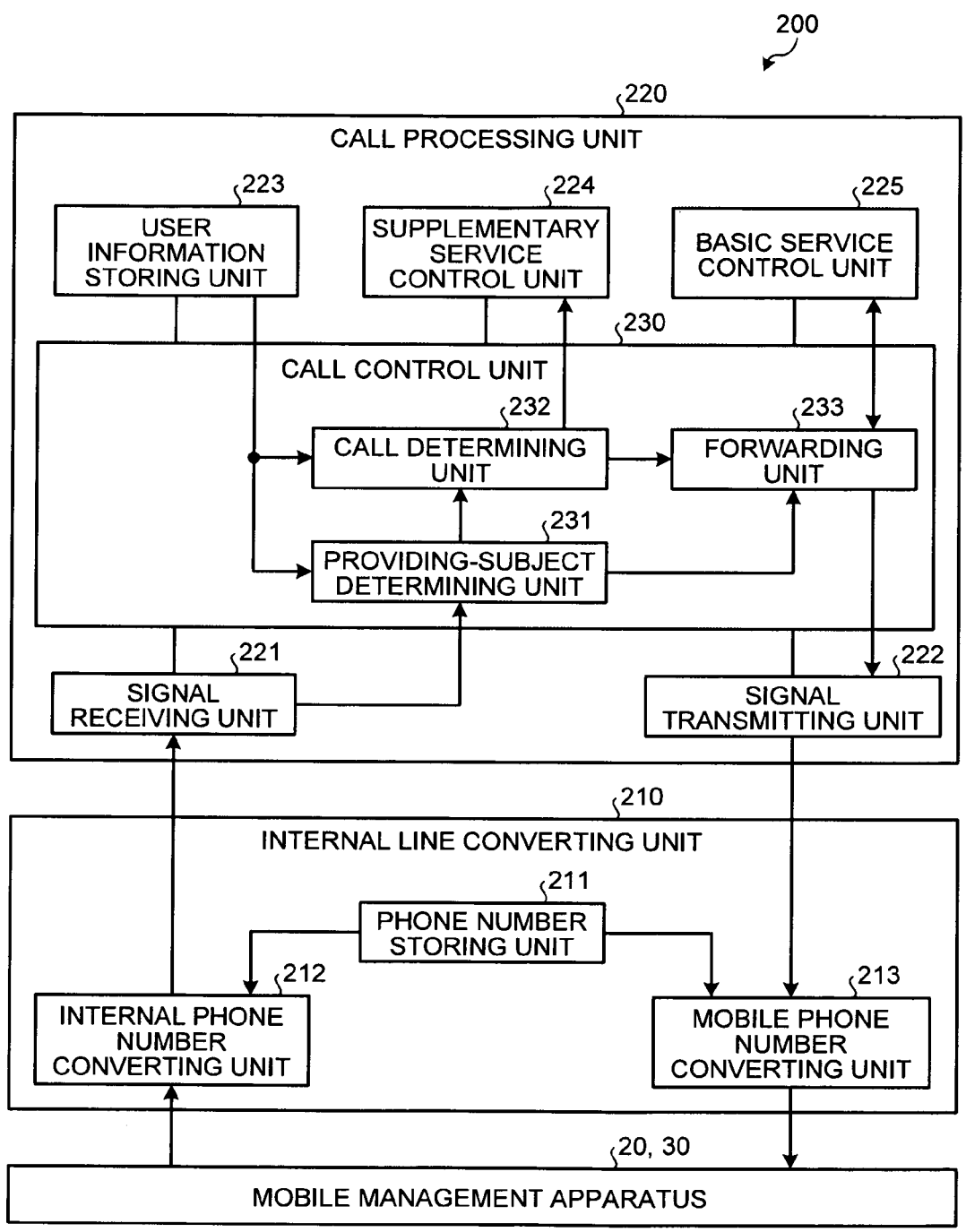
FIG. 4 is a block diagram illustrating an example configuration of an internal line managing apparatus according to the second embodiment.

Configuration of the Internal Line Managing Apparatus According to the Second Embodiment In the following, the internal line managing apparatus 200 according to the second embodiment will be described with reference to FIG. 4. FIG. 4 is a block diagram illustrating an example configuration of the internal line managing apparatus 200 according to the second embodiment. As illustrated in FIG. 4, the internal line managing apparatus 200 according to the second embodiment includes an internal line converting unit 210 and a call processing unit 220.

The internal line converting unit 210 converts a mobile phone number and an internal phone number. Specifically, the internal line converting unit 210 includes a phone number storing unit 211, an internal phone number converting unit 212, and a mobile phone number converting unit 213.

The phone number storing unit 211 stores therein mobile phone numbers and internal phone numbers in an associated manner. FIG. 5 is a schematic diagram illustrating an example of the phone number storing unit 211 according to the second embodiment. As illustrated in FIG. 5, the phone number storing unit 211 includes items, such as "mobile phone number", "tenant", and "internal phone number".

The "mobile phone number" indicates the mobile phone numbers assigned to each of the mobile phones 11 to 14. The "tenant" indicates an identification number to identify an internal line group. For example, an internal phone service generally allows an internal phone call between mobile phones belonging to the same internal line group. The "tenant" is used when, for example, the internal line managing apparatus 200 determines whether the mobile phones belong to the same internal line group. The "tenant" is less related to the process performed by the communication system 2 according to the second embodiment; therefore, a description thereof in detail will be omitted here. The "internal phone number" indicates the internal phone numbers assigned to each of the mobile phones 11 to 14.

For example, in the phone number storing unit 211 illustrated in FIG. 5, the internal phone number "1001" is assigned to a mobile phone to which the mobile phone number "090-A" is assigned. Furthermore, in the phone number storing unit 211 illustrated in FIG. 5, the internal phone number "1002" is assigned to a mobile phone to which the mobile phone number "090-B" is assigned.

If the internal phone number converting unit 212 receives an internal line call request, the internal phone number converting unit 212 converts, to an internal phone number in accordance with the various kinds of information stored in the phone number storing unit 211, a mobile phone number of the source mobile phone included in the internal line call request. For example, suppose that the various kinds of information stored in the phone number storing unit 211 are like that illustrated in FIG. 5 and suppose that the internal line managing apparatus 200 receives an internal line call request including the mobile phone number "090-A" of the source mobile phone. In such a case, the internal phone number converting unit 212 converts the mobile phone number "090-A" of the source mobile phone included in the internal line call request to the internal phone number "1001".

The reason for the internal phone number converting unit 212 converting the mobile phone number of the source mobile phone to the internal phone number is to notify a called party's mobile phone of the internal phone number as a phone number of the source mobile phone.

If the mobile phone number converting unit 213 receives an internal line call request from a signal transmitting unit 222, which will be described later, the mobile phone number converting unit 213 converts the internal phone number of the called party's mobile phone included in the internal line call request to the mobile phone number. Then, the mobile phone number converting unit 213 transmits the internal line call request including the mobile phone number of the called party's mobile phone to the mobile management apparatus 20 or the like. For example, suppose that the various kinds of information stored in the phone number storing unit 211 are like that illustrated in FIG. 5 and suppose that the internal line managing apparatus 200 receives an internal line call request including the internal phone number "2001" of the called party's mobile phone. In such a case, the mobile phone number converting unit 213 converts the mobile phone number "2001" of the called party's mobile phone included in the internal line call request to the internal phone number "090-C".

The internal phone number converting unit 212 and the mobile phone number converting unit 213 may perform protocol conversion or the like. For example, the internal phone number converting unit 212 and the mobile phone number converting unit 213 may perform protocol conversion between the integrated services digital network user part (ISUP) and the session initiation protocol (SIP).

As illustrated in FIG. 4, the call processing unit 220 performs various processes related to a call. Specifically, the call processing unit 220 includes a signal receiving unit 221, the signal transmitting unit 222, a user information storing unit 223, a supplementary service control unit 224, a basic service control unit 225, and a call control unit 230.

The signal receiving unit 221 and the signal transmitting unit 222 are interfaces that transmit/receive various signals to/from the internal line converting unit 210. Specifically, the signal receiving unit 221 receives an internal line call request in which the mobile phone number of the source mobile phone is converted to an internal phone number by the internal phone number converting unit 212 and transmits the received internal line call request to a providing-subject determining unit 231. The signal transmitting unit 222 transmits the internal line call request transmitted from a forwarding unit 233, which will be described later, to the mobile phone number converting unit 213.

The user information storing unit 223 stores therein the various kinds of information on mobile phones that use the internal phone service. FIG. 6 is a schematic diagram illustrating an example of the user information storing unit 223 according to the second embodiment. As illustrated in FIG. 6, the user information storing unit 223 includes items, such as "tenant", "internal phone number", "providing subject", and "call status".

The "tenant" corresponds to the "tenant" stored in the phone number storing unit 211 illustrated in FIG. 5. The "internal phone number" indicates an internal phone number assigned to each mobile phone that uses the internal phone service. This "internal phone number" corresponds to the "internal phone number" stored in the phone number storing unit 211 illustrated in FIG. 5.

The "providing subject" indicates which one of the internal line managing apparatus 200 and the mobile management apparatuses 20 and 30 provides the supplementary service. In the example illustrated in FIG. 6, if an "internal line party" is stored in the "providing subject", a supplementary service is provided by the internal line managing apparatus 200. If a "mobile phone party" is stored in the "providing subject", the supplementary service is provided by the mobile management apparatuses 20 and 30. Either one of the internal line managing apparatus and the mobile management apparatus selected by a user is stored in the "providing subject" stored in the user information storing unit 223.

The "call status" indicates whether a mobile phone is used as an internal phone and is in a call connection. In other words, the "call status" indicates whether a mobile phone is in an internal phone call. In the example illustrated in FIG. 6, if an "available" is stored in the "call status", this indicates that a mobile phone is not in a call connection. If "busy" is stored in the "call status", this indicates that a mobile phone is in a call connection.

The supplementary service control unit 224 provides a supplementary service in accordance with the control performed by the call control unit 230. For example, the supplementary service control unit 224 provides a supplementary service, such as a voice mail service that can record a message of a caller or a forwarding service that forwards an incoming call to another mobile phone. If an incoming call process is performed by a mobile phone using an internal phone function, the basic service control unit 225, for example, acquires a voice channel in accordance with an instruction from the call control unit 230.

If an incoming call process is performed by a mobile phone using an internal phone function, the call control unit 230 controls communication between the mobile phones. Specifically, the call control unit 230 includes the providing-subject determining unit 231, a call determining unit 232, and the forwarding unit 233.

If the providing-subject determining unit 231 receives an internal line call request from the signal receiving unit 221, the providing-subject determining unit 231 determines, in accordance with the various kinds of information stored in the user information storing unit 223, a providing subject of a supplementary service associated with a called party's mobile phone.

Specifically, the providing-subject determining unit 231 obtains, from the user information storing unit 223, a providing subject associated with an internal phone number of a called party's mobile phone included in an internal line call request. Then, if the providing subject obtained from the user information storing unit 223 is an "internal line party", the providing-subject determining unit 231 transmits the internal line call request to the call determining unit 232.

In contrast, if the providing subject obtained from the user information storing unit 223 is a "mobile phone party", the providing-subject determining unit 231 transmits the internal line call request to the forwarding unit 233 in order to perform an incoming call process on the internal line call request. In other words, the providing-subject determining unit 231 sends an incoming call instruction to the forwarding unit 233.

If the call determining unit 232 receives an internal line call request from the providing-subject determining unit 231, the call determining unit 232 determines whether a called party's mobile phone is in a call connection. Specifically, the call determining unit 232 obtains, from the user information storing unit 223, the call status associated with the internal phone number of the called party's mobile phone included in the internal line call request. Then, if the call status obtained from the user information storing unit 223 indicates "available", the call determining unit 232 determines that the called party's mobile phone is not in a call connection. Thereafter, to perform the incoming call process on the internal line call request, the call determining unit 232 transmits the internal line call request to the forwarding unit 233. In other words, the call determining unit 232 instructs the forwarding unit 233 to perform an incoming call.

In contrast, if the call status obtained from the user information storing unit 223 indicates "busy", the call determining unit 232 determines that the called party's mobile phone is in a call connection, and the call determining unit 232 instructs the supplementary service control unit 224 to provide a supplementary service.

If the forwarding unit 233 receives, from the providing-subject determining unit 231 or the call determining unit 232, an internal line call request, i.e., the incoming call instruction, the forwarding unit 233 performs the incoming call process. Specifically, by cooperating with the basic service control unit 225, the forwarding unit 233 determines the forwarding destination of the internal line call request. Then, the forwarding unit 233 performs routing to forward the internal line call request to the mobile management apparatus 20 or 30 that is the determined destination. In other words, the forwarding unit 233 instructs the mobile management apparatus 20 or 30 to perform the incoming call process.

In the following, a process performed by the internal line managing apparatus 200 will be specifically described. Here, suppose that the various kinds of information stored in the user information storing unit 223 are like that illustrated in FIG. 6. First, suppose that the providing-subject determining unit 231 receives, from the signal receiving unit 221, the internal line call request including the internal phone number "1001" of a called party's mobile phone. In such a case, the providing-subject determining unit 231 obtains, from the user information storing unit 223, a providing subject "internal line party" associated with the internal phone number "1001". Accordingly, the providing-subject determining unit 231 transmits, to the call determining unit 232, the internal line call request received from the signal receiving unit 221.

The call determining unit 232 that has received the internal line call request obtains, from the user information storing unit 223, the call status "available" associated with the internal phone number "1001". In other words, the call determining unit 232 determines that the called party's mobile phone is not in a call connection. Then, to perform the incoming call process on the internal line call request, the call determining unit 232 transmits the internal line call request to the forwarding unit 233. Thereafter, by cooperating with the basic service control unit 225, the forwarding unit 233 determines the destination of the internal line call request and transmits the internal line call request to the mobile management apparatus 20 or 30 that is the determined destination.

Furthermore, for example, suppose that the providing-subject determining unit 231 receives, from the signal receiving unit 221, an internal line call request including the internal phone number "1002" of a called party's mobile phone. In such a case, the providing-subject determining unit 231 obtains, from the user information storing unit 223, a providing subject "mobile phone party" associated with the internal phone number "1002". Accordingly, the providing-subject determining unit 231 transmits the internal line call request received from the signal receiving unit 221 to the forwarding unit 233. Then, by cooperating with the basic service control unit 225, the forwarding unit 233 determines the destination of the internal line call request and transmits the internal line call request to the mobile management apparatus 20 or 30 that is the determined destination.

As illustrated in FIG. 6, the called party's mobile phone whose internal phone number is "1002" is "busy". Accordingly, the mobile management apparatus 20 or 30 that receives the internal line call request from the forwarding unit 233 determines that the called party's mobile phone is in a call connection and then provides a supplementary service. In this way, if the "mobile phone party" is stored in the providing subject in the user information storing unit 223, the mobile management apparatus 20 or 30 can provide the supplementary service.

Furthermore, for example, suppose that the providing-subject determining unit 231 receives, from the signal receiving unit 221, an internal line call request including the internal phone number "5001" of a called party's mobile phone. In such a case, the providing-subject determining unit 231 obtains, from the user information storing unit 223, a providing subject "internal line party" associated with the internal phone number "5001". Accordingly, the providing-subject determining unit 231 transmits the internal line call request received from the signal receiving unit 221 to the call determining unit 232.

The call determining unit 232 that has received the internal line call request obtains, from the user information storing unit 223, a call status "busy" that is associated with the internal phone number "5001". In other words, the call determining unit 232 determines that the called party's mobile phone is in a call connection. Then, the call determining unit 232 instructs the supplementary service control unit 224 to provide a supplementary service. In this way, if the "internal line party" is stored in the providing subject in the user information storing unit 223, the internal line managing apparatus 200 can provide the supplementary service.

Figure 7:
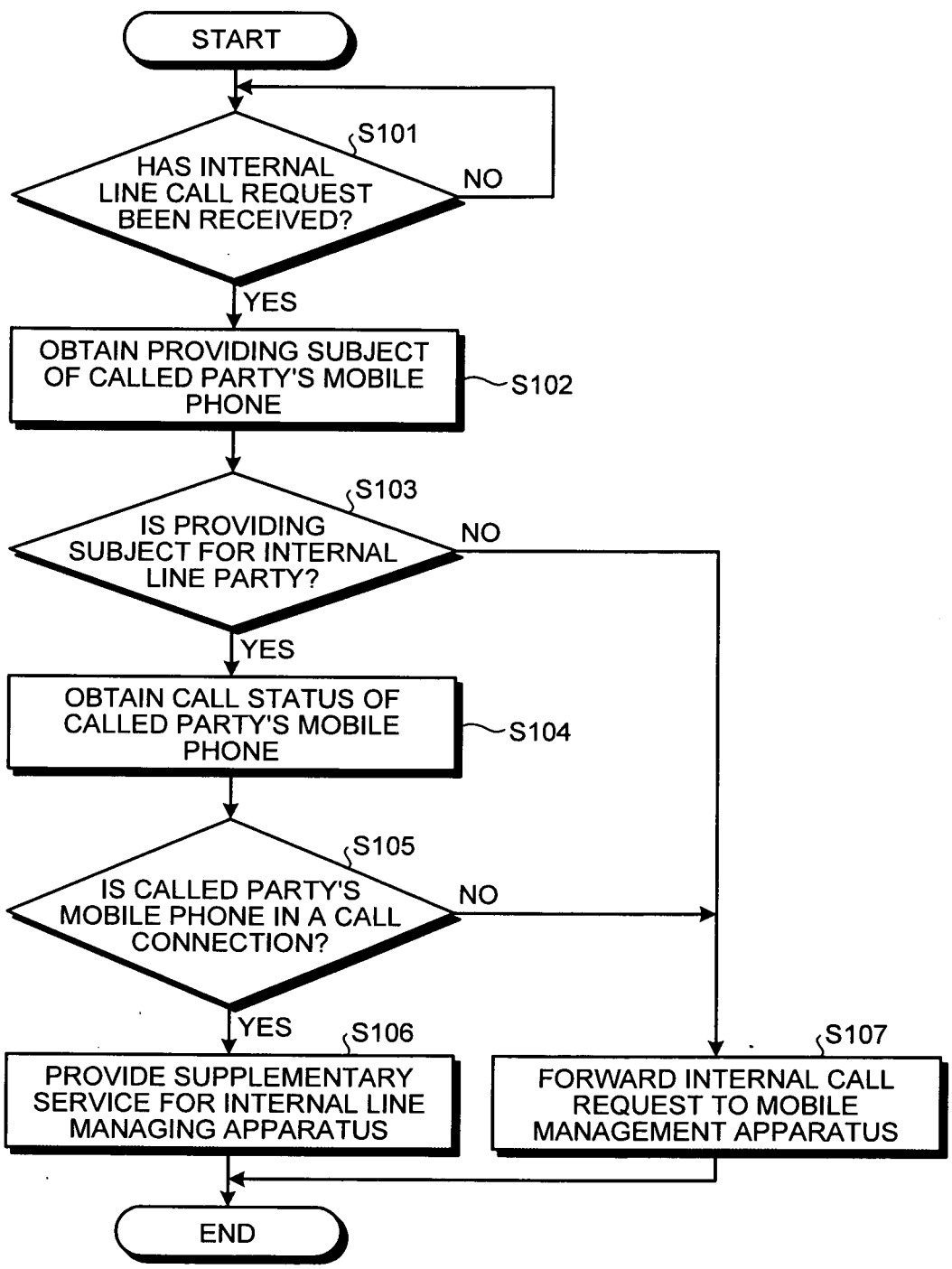
FIG. 7 is a flowchart illustrating the flow of an internal phone management process performed by the internal line managing apparatus according to the second embodiment.

Flow of the Internal Phone Management Process Performed by the Internal Line Managing Apparatus According to the Second Embodiment In the following, the flow of the internal phone management process performed by the internal line managing apparatus 200 according to the second embodiment will be described with reference to FIG. 7. FIG. 7 is a flowchart illustrating the flow of the internal phone management process performed by the internal line managing apparatus 200 according to the second embodiment.

As illustrated in FIG. 7, if the providing-subject determining unit 231 receives an internal line call request (Yes at Step S101), the providing-subject determining unit 231 obtains, from the user information storing unit 223, a providing subject that is associated with an internal phone number of a called party's mobile phone included in the internal line call request (Step S102). Then, the providing-subject determining unit 231 determines, in accordance with the providing subject received from the user information storing unit 223, the providing subject of the supplementary service associated with the called party's mobile phone (Step S103).

If the providing-subject determining unit 231 determines that the providing subject is the internal line managing apparatus 200 (Yes at Step S103), the call determining unit 232 obtains, from the user information storing unit 223, a call status that is associated with the internal phone number of the called party's mobile phone (Step S104). Then, the call determining unit 232 determines, in accordance with the call status obtained from the user information storing unit 223, whether the called party's mobile phone is in a call connection (Step S105).

If the call determining unit 232 determines that the called party's mobile phone is in a call connection (Yes at Step S105), the call determining unit 232 provides a supplementary service in cooperation with the supplementary service control unit 224 (Step S106).

In contrast, if the providing-subject determining unit 231 determines that the providing subject is the mobile management apparatus 20 or 30 (No at Step S103), the forwarding unit 233 forwards the internal line call request to the mobile management apparatus 20 or 30 (Step S107). Furthermore, if the call determining unit 232 determines that the called party's mobile phone is not in a call connection (No at Step S105), the forwarding unit 233 also forwards the internal line call request to the mobile management apparatus 20 or 30 (Step S107).

Advantage of the Second Embodiment

As described above, when an internal line call request is received in the communication system 2 according to the second embodiment, if a providing subject of a called party's mobile phone indicates the mobile management apparatus, the internal line managing apparatus 200 forwards the internal line call request to the mobile management apparatus. Accordingly, if the called party's mobile phone is in a call connection, the mobile management apparatus provides a supplementary service. Furthermore, if the providing subject of the called party's mobile phone indicates the internal line managing apparatus, the internal line managing apparatus 200 determines whether the called party's mobile phone is in a call connection. If the called party's mobile phone is in a call connection, the internal line managing apparatus 200 provides the supplementary service. In this way, if the communication system 2 according to the second embodiment receives an internal line call request with respect to a mobile phone that is in a call connection, the communication system 2 can provide the supplementary service using the providing subject that is selected by a user in advance.

[c] Third Embodiment

The providing subject stored in the user information storing unit 223 described in the second embodiment can be updated by a user. Accordingly, in a third embodiment, an example of a communication system that can update the providing subject stored in the user information storing unit 223 will be described. Because an example configuration of a communication system 3 according to the third embodiment is the same as that illustrated in FIG. 3, a description thereof will be omitted here.

Figure 8:
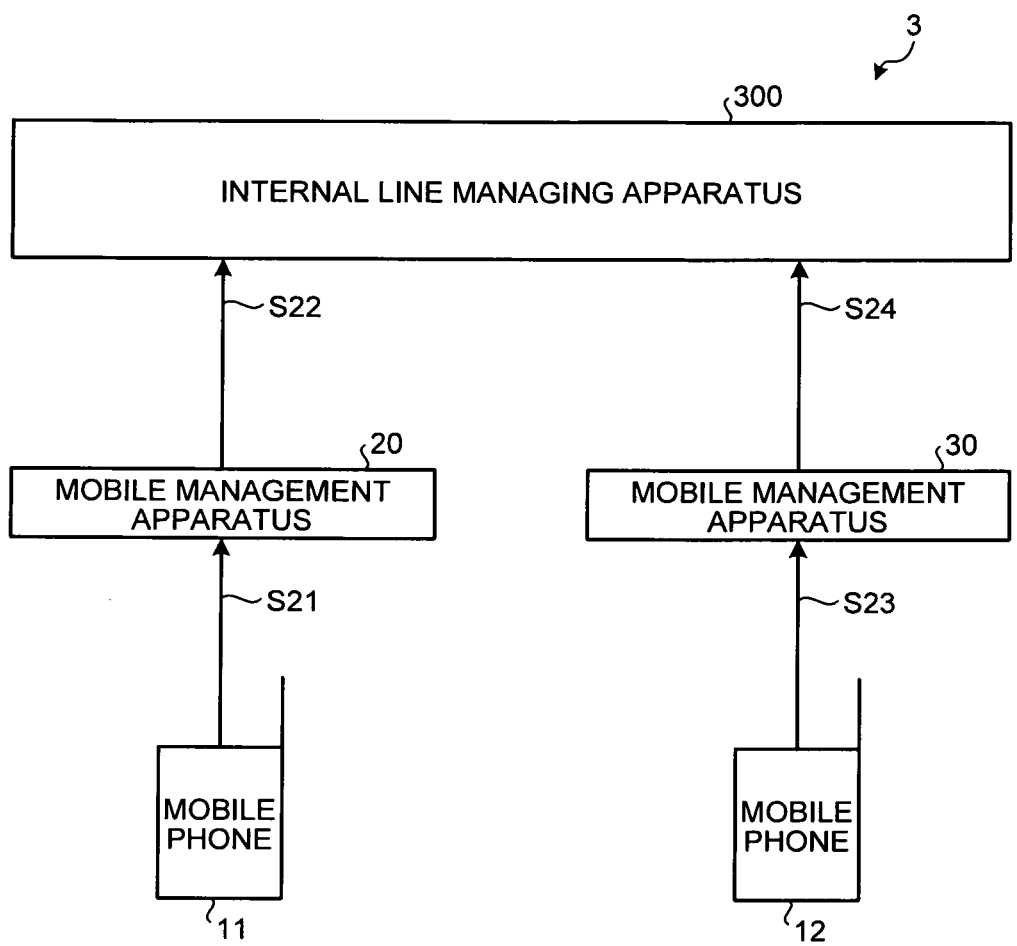
FIG. 8 is a schematic diagram illustrating an example of a providing-subject update process performed by a communication system according to a third embodiment.
Figure 9:
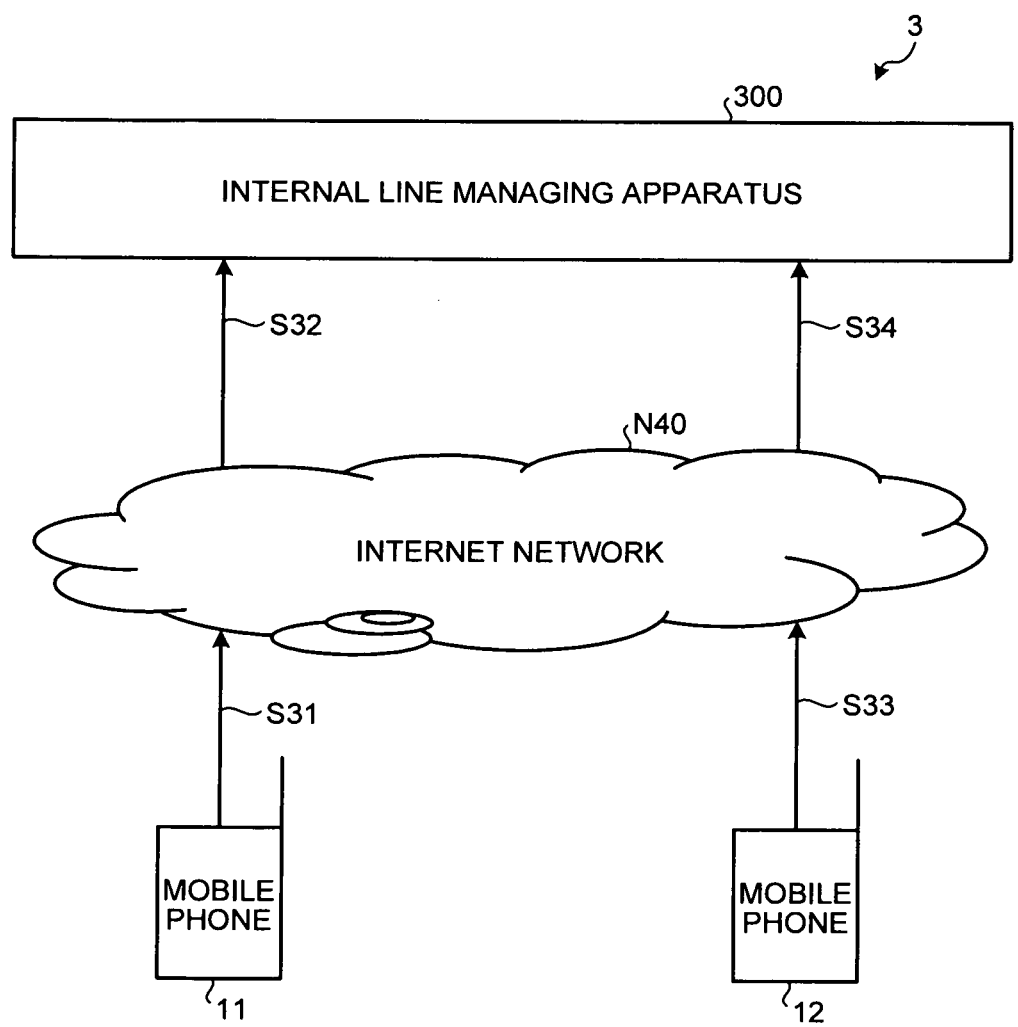
FIG. 9 is a schematic diagram illustrating an example of the providing-subject update process performed by the communication system according to the third embodiment.

Providing-Subject Update Process Performed by the Communication System 3 According to the Third Embodiment First, the providing-subject update process performed by the communication system 3 according to the third embodiment will be described with reference to FIGS. 8 and 9. FIGS. 8 and 9 are each schematic diagrams illustrating an example of the providing-subject update process performed by the communication system 3 according to the third embodiment.

FIG. 8 illustrates an example case in which a providing subject stored in the user information storing unit 223 is updated by a user inputting a specific number into, for example, the mobile phone 11 and making a call request. In the following, there may be a case in which a specific number that is used to update a providing subject is referred to as a "specific update number".

For example, suppose that a specific update number is "000-0000-0000-N". Furthermore, suppose that, if information denoted by "N" of the specific update number is "1", the providing subject indicates an internal line managing apparatus, and suppose that, if information denoted by "N" is "2", the providing subject indicates a mobile management apparatus. In such a case, by dialing "000-0000-0000-1" using, for example, the mobile phone 11, a user can update the providing subject stored in the user information storing unit 223 to an "internal line party". Furthermore, by dialing "000-0000-0000-2" using, for example, the mobile phone 11, a user can update the providing subject stored in the user information storing unit 223 to a "mobile phone party".

In the following, the providing-subject update process will be specifically described with reference to FIG. 8. As illustrated in FIG. 8, if a user inputs a specific update number including providing-subject information indicating a providing subject and presses a call button on the mobile phone 11 that currently performs wireless communication with the mobile management apparatus 20, the mobile phone 11 transmits, to the mobile management apparatus 20, a notification indicating that the subject information will be changed (Step S21). In the following, there may be a case in which a notification indicating that the subject information is changed is referred to as a "subject information notification".

If the mobile management apparatus 20 receives a subject information notification from the mobile phone 11, the mobile management apparatus 20 transmits that subject information notification to an internal line managing apparatus 300 (Step S22). The internal line managing apparatus 300 that has received the subject information notification analyzes the specific update number and updates, from among the providing subjects stored in the user information storing unit 223, a providing subject associated with the mobile phone 11.

Similarly, if a user inputs a specific update number including providing-subject information indicating a providing subject and presses a call button on the mobile phone 12 that currently performs wireless communication with the mobile management apparatus 30, the mobile phone 12 transmits, to the mobile management apparatus 30, a notification indicating that the subject information will be changed (Step S23). Then, the mobile management apparatus 30 transmits the subject information notification to the internal line managing apparatus 300 (Step S24). The internal line managing apparatus 300 that has received the subject information notification analyzes the specific update number and updates, from among the providing subjects stored in the user information storing unit 223, a providing subject associated with the mobile phone 12.

In the example illustrated in FIG. 9, a case is described in which the providing subjects stored in the user information storing unit 223 are updated by a user accessing the internal line managing apparatus 300 via the Internet network. For example, a user starts, for example, a Web browser installed on the mobile phone 11 and accesses the internal line managing apparatus 300 using that Web browser. The internal line managing apparatus 300 provides the mobile phone 11 with an update screen that is used to update the providing subject. Then, if an operation of updating a providing subject is performed on the update screen, the internal line managing apparatus 300 updates the providing subject stored in the user information storing unit 223.

The providing-subject update process will be specifically described with reference to FIG. 9. As illustrated in FIG. 9, if a user accesses the update screen on the mobile phone 11 that currently performs wireless communication with the mobile management apparatus 20, the mobile phone 11 accesses the internal line managing apparatus 300 via the Internet network N40 (Steps S31 and S32). Then, the internal line managing apparatus 300 transmits, to the mobile phone 11, for example, hypertext markup language (HTML) data that can display the update screen on the mobile phone 11. Accordingly, a user of the mobile phone 11 can update a providing subject stored in the user information storing unit 223 using the update screen.

Similarly, if a user accesses the update screen on the mobile phone 12 that currently performs wireless communication with the mobile management apparatus 30, the mobile phone 12 accesses the internal line managing apparatus 300 via the Internet network N40 (Steps S33 and S34). Then, the internal line managing apparatus 300 transmits, to the mobile phone 12, for example, HTML data that can display the update screen on the mobile phone 12. Accordingly, a user of the mobile phone 12 can update a providing subject stored in the user information storing unit 223 on the update screen.

In FIG. 9, an example case in which the internal line managing apparatus 300 is accessed by, for example, the mobile phone 11 has been described. However, the internal line managing apparatus 300 can be accessed by something other than a mobile phone, for example, a personal computer.

Figure 10:
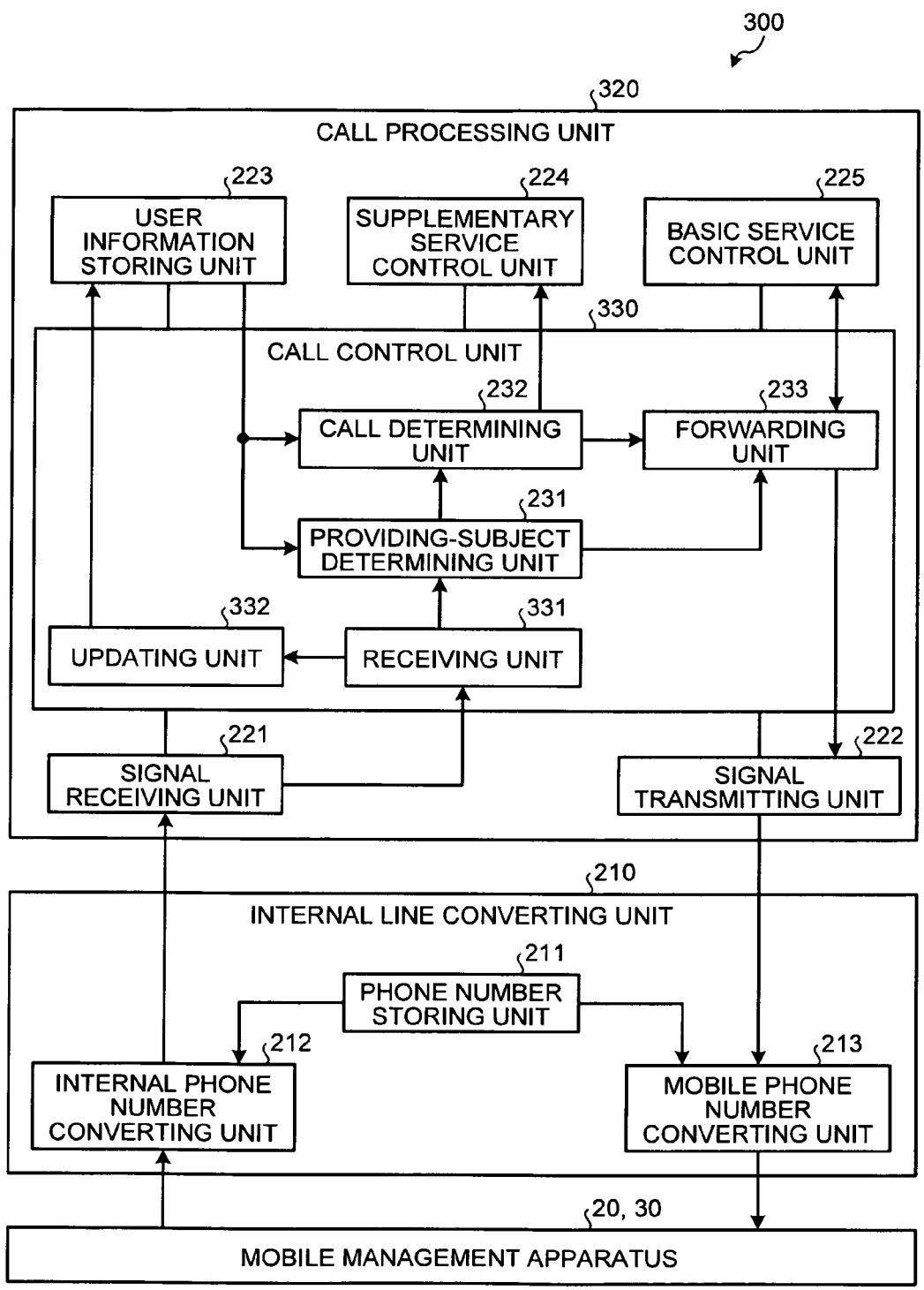
FIG. 10 is a block diagram illustrating an example configuration of an internal line managing apparatus according to the third embodiment.

Configuration of the Internal Line Managing Apparatus According to the Third Embodiment In the following, the internal line managing apparatus 300 according to the third embodiment will be described with reference to FIG. 10. FIG. 10 is a block diagram illustrating an example configuration of the internal line managing apparatus 300 according to the third embodiment. In FIG. 10, an example configuration of the internal line managing apparatus 300 that performs the providing-subject update process illustrated in FIG. 8 will be described. Furthermore, in the following, components having the same function as those illustrated in FIG. 4 are assigned the same reference numerals, and therefore descriptions thereof will be omitted.

As illustrated in FIG. 10, the internal line managing apparatus 300 according to the third embodiment includes a call control unit 330 in a call processing unit 320. The call control unit 330 includes a receiving unit 331 and an updating unit 332. If the receiving unit 331 receives a call connection request including an internal phone number from the signal receiving unit 221, the receiving unit 331 determines, in accordance with a called party's phone number included in the call connection request, whether the call connection request is a subject information notification.

For example, suppose that a specific update number is "000-0000-0000-N", which is the same as that described above. If the receiving unit 331 receives a call connection request including the called party's phone number "000-0000-0000-N", the receiving unit 331 determines that the call connection request is a subject information notification. Then, if the call connection request is the subject information notification, the receiving unit 331 transmits the call connection request to the updating unit 332.

In contrast, if the receiving unit 331 receives a call connection request including, for example, the called party's phone number "111-1111-1111", the receiving unit 331 determines that the call connection request is not a subject information notification but an internal line call request. In such a case, the receiving unit 331 transmits the internal line call request to the providing-subject determining unit 231. The subsequent processes performed by, for example, the providing-subject determining unit 231, are the same as those performed by the internal line managing apparatus 200 according to the second embodiment.

If the receiving unit 331 determines that the call connection request is the subject information notification, the updating unit 332 updates, to subject information included in the subject information notification, a providing subject that is stored in the user information storing unit 223 and that is associated with an internal phone number included in the subject information notification. After the providing-subject update process ends, the updating unit 332 can transmit, to the mobile phone 11, a completion notification indicating that the update process has been completed.

Figure 11:
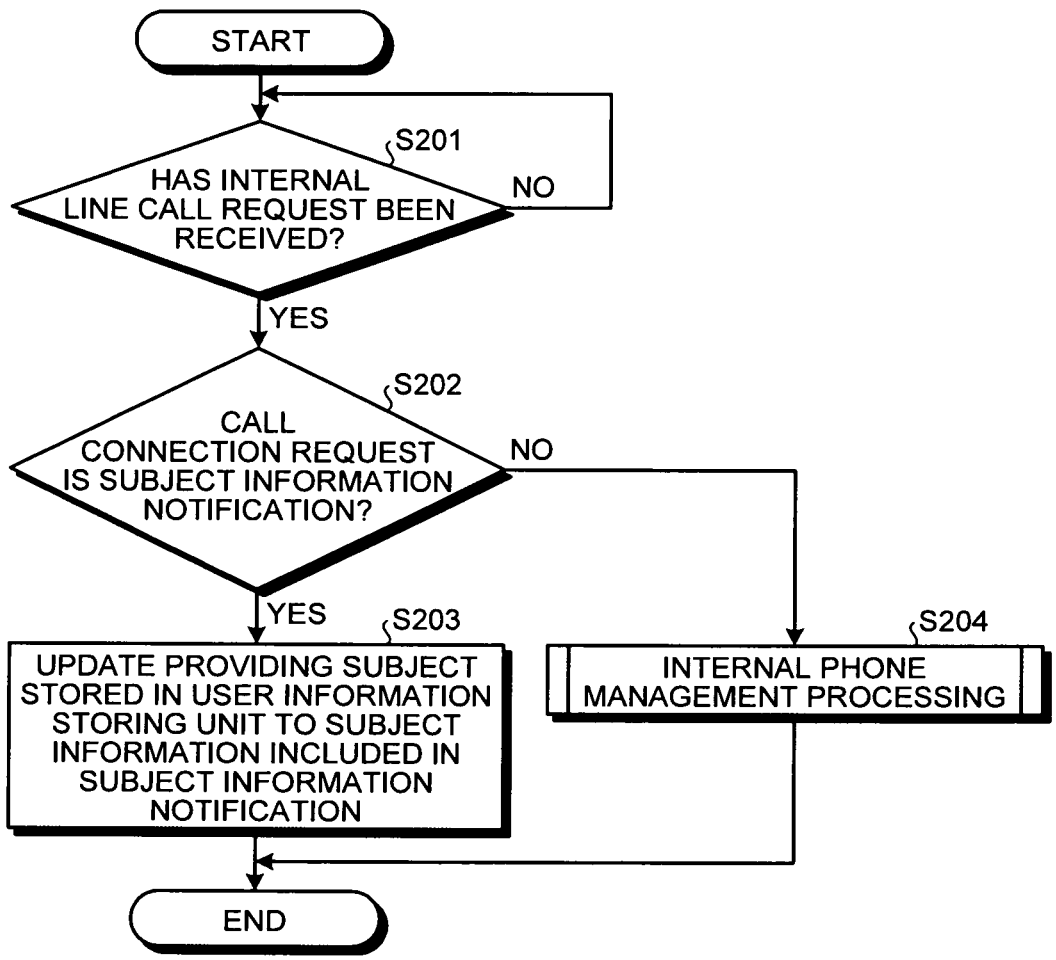
FIG. 11 is a flowchart illustrating the flow of a providing-subject update process performed by an internal line managing apparatus according to the third embodiment.

Flow of the Providing-Subject Update Process Performed by the Internal Line Managing Apparatus According to the Third Embodiment In the following, the flow of the providing-subject update process performed by the internal line managing apparatus 300 according to the third embodiment will be described with reference to FIG. 11. FIG. 11 is a flowchart illustrating the flow of the providing-subject update process performed by the internal line managing apparatus 300 according to the third embodiment.

As illustrated in FIG. 11, if the receiving unit 331 receives a call connection request (Yes at Step S201), the receiving unit 331 determines, in accordance with a called party's phone number included in the call connection request, whether the call connection request is a subject information notification (Step S202).

If the receiving unit 331 determines that the call connection request is a subject information notification (Yes at Step S202), the updating unit 332 performs the providing-subject update process. Specifically, the updating unit 332 updates, to the subject information included in the subject information notification, a providing subject that is stored in the user information storing unit 223 and that is associated with the internal phone number included in the subject information notification (Step S203).

In contrast, if the receiving unit 331 determines that the call connection request is not a subject information notification (No at Step S202), the internal line managing apparatus 300 performs the internal phone management processes performed at Steps S102 to S107 illustrated in FIG. 7 (Step S204).

Advantage of the Third Embodiment

As described above, the communication system 3 according to the third embodiment can change the subject that provides a supplementary service.

[d] Fourth Embodiment

The communication system, the internal line managing apparatus, the internal phone management method, and the non-transitory computer readable storage medium disclosed in the present invention can be implemented with various kinds of embodiments other than the embodiments described above. Accordingly, in a fourth embodiment, another embodiment of a communication system, an internal line managing apparatus, an internal phone management method, and a non-transitory computer readable storage medium disclosed in the present invention will be described.

Configuration of the Communication System

Figure 12:
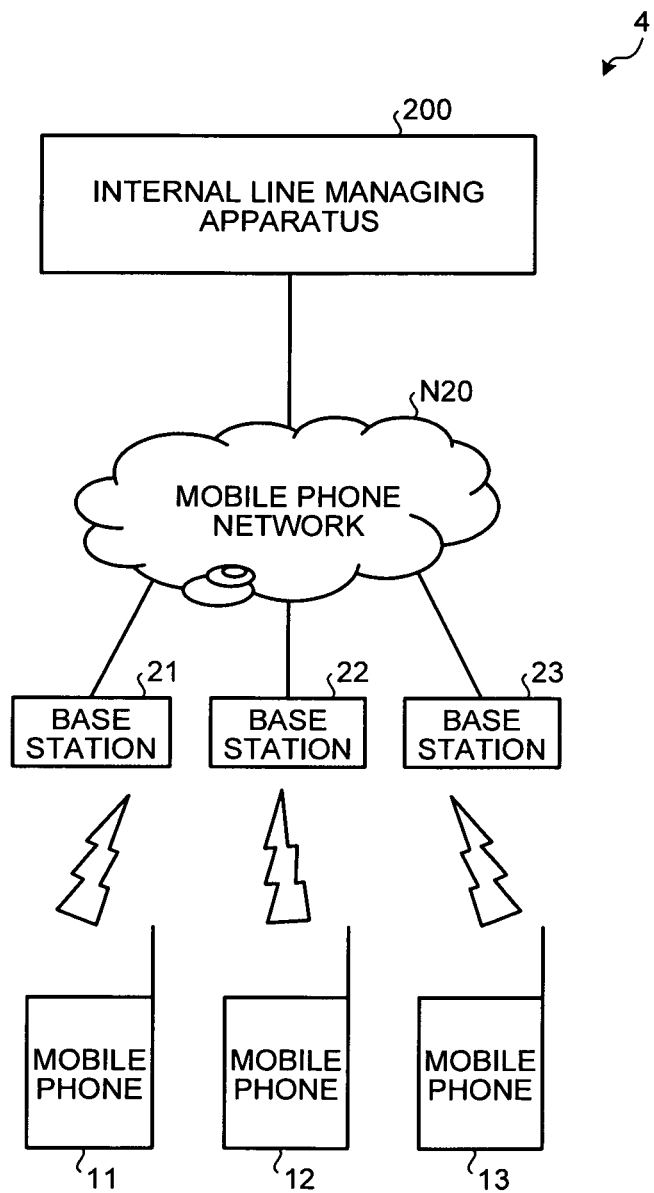
FIG. 12 is a block diagram illustrating an example configuration of a communication system according to another embodiment.

In the embodiments described above, an example case is described in which communication is performed using both the mobile phone network N20 and the mobile phone network N30 illustrated in FIG. 3. However, with the configuration of the communication system disclosed in the present invention, the present invention can be applied to a case in which communication is performed without using multiple mobile phone networks. Such a case will be specifically described with reference to FIG. 12. FIG. 12 is a block diagram illustrating an example configuration of a communication system 4 according to another embodiment. As illustrated in FIG. 12, the communication system 4 includes the base stations 21 to 23 and the internal line managing apparatus 200. The internal line managing apparatus 200 is the same as that described in the second embodiment.

In the example illustrated in FIG. 12, for example, suppose that the mobile phone 11 and the mobile phone 12 are used as internal phones and suppose that they are in a call connection. Furthermore, suppose that the mobile phone 13 has dialed an internal phone number of the mobile phone 11. In this case, suppose that a providing subject of the mobile phone 11 is the mobile management apparatus 20. Although not illustrated in FIG. 12, the mobile management apparatus is arranged in the mobile phone network N20.

In such a case, the mobile phone 13 transmits an internal line call request to the internal line managing apparatus 200 via the base station 23 and the mobile phone network N20. Then, the internal line managing apparatus 200 transmits the internal line call request to the mobile phone network N20 without determining whether the called party's mobile phone 11 is in a call connection. A mobile management apparatus (not illustrated) in the mobile phone network N20 provides a supplementary service because the mobile phone 11 is in a call connection. In the example illustrated in FIG. 12, the base stations 21 to 23 can be mobile management apparatuses.

Providing a Supplementary Service

In the first to fourth embodiments, an example case is described in which the internal line managing apparatus or the mobile management apparatus provides a supplementary service. However, the internal line managing apparatus or the mobile management apparatus can merely control the providing of a supplementary service. For example, when the internal line managing apparatus or the mobile management apparatus provides a supplementary service, the internal line managing apparatus or the mobile management apparatus can instruct a dedicated apparatus providing a supplementary service, such as a voice mail center, to provide a supplementary service.

Mobile Phone

Furthermore, in the first to fourth embodiments, the mobile phone is used as an example of a mobile terminal. However, the mobile phones described in the first to fourth embodiments can be, for example, another mobile terminal device, such as a personal digital assistant (PDA).

Program

Furthermore, various processes described in the above embodiments can be implemented by a program prepared in advance and executed by a computer such as a personal computer or a workstation. Accordingly, in the following, a computer that executes an internal phone management program having the same function as the internal line managing apparatus 100 illustrated in FIG. 1 will be described with reference to FIG. 13.

Figure 13:
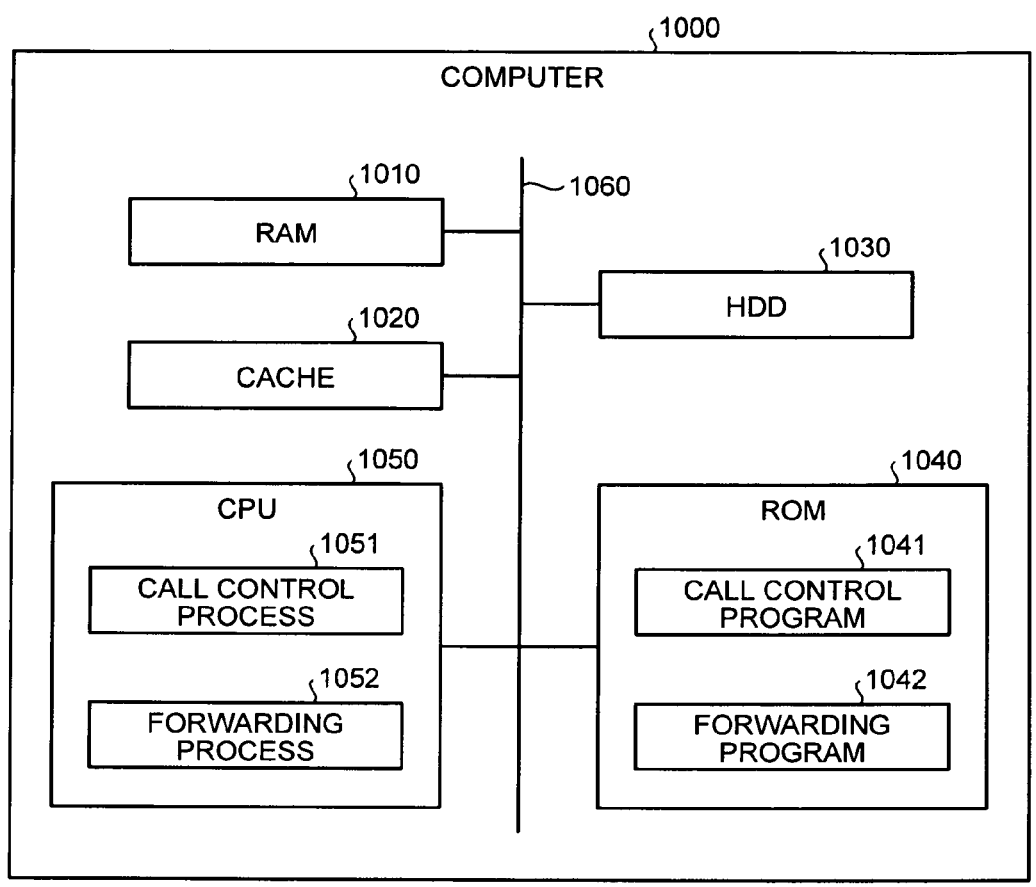
FIG. 13 is a block diagram illustrating a computer that executes an internal phone management program.
Figure 14:
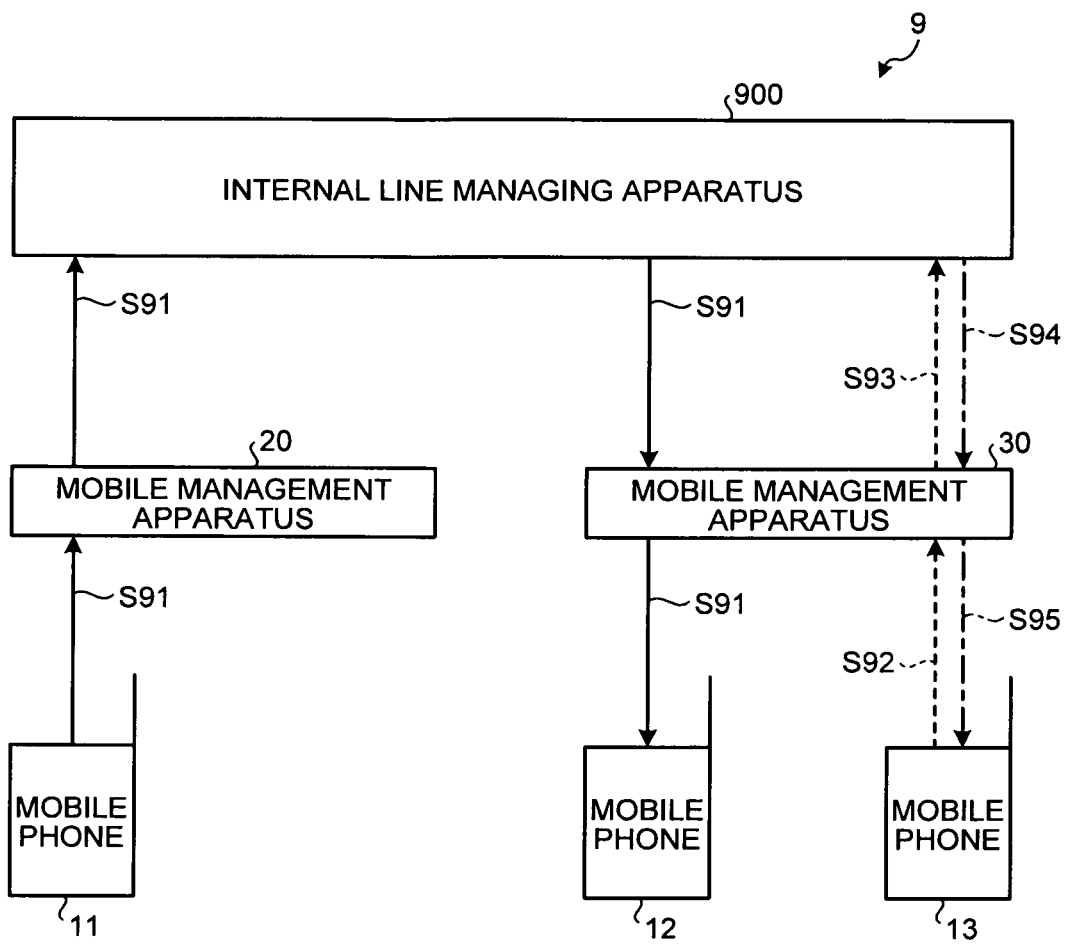
FIG. 14 is a schematic diagram illustrating an example configuration of a conventional communication system.

FIG. 13 is a block diagram illustrating a computer that executes an internal phone management program. As illustrated in FIG. 13, a computer 1000 includes a random access memory (RAM) 1010, a cache 1020, an HDD 1030, a read only memory (ROM) 1040, a central processing unit (CPU) 1050, and a bus 1060. The RAM 1010, the cache 1020, the HDD 1030, the ROM 1040, and the CPU 1050 are connected by the bus 1060.

The ROM 1040 stores therein, in advance, an internal phone management program having the same function performed by the internal line managing apparatus 100 illustrated in FIG. 1. Specifically, The ROM 1040 stores therein a call control program 1041 and a forwarding program 1042. The CPU 1050 reads the call control program 1041 and the forwarding program 1042 from the ROM 1040 and executes them.

Accordingly, as illustrated in FIG. 13, the call control program 1041 functions as a call control process 1051. Furthermore, the forwarding program 1042 functions as a forwarding process 1052. Furthermore, the call control process 1051 corresponds to the call control unit 101 illustrated in FIG. 1. The forwarding process 1052 corresponds to the forwarding unit 102 illustrated in FIG. 1.

The above described programs 1041 and 1042 are not necessarily stored in the ROM 1040. For example, the programs 1041 and 1042 can be stored in a "portable physical medium", such as a flexible disk (FD), a CD-ROM, an MO disk, a DVD disk, a magneto-optic disk, an IC card, and the like, that can be inserted into the computer 1000. Alternatively, the programs 1041 and 1042 can also be stored in a "fixed physical medium", such as a hard disk drive (HDD), that can be arranged inside/outside the computer 1000. Alternatively, the programs 1041 and 1042 can also be stored in "another computer (or a server)" connected to the computer 1000 via a public circuit, the Internet, a LAN, a WAN, and the like. The computer 1000 then reads and executes the programs from the flexible disk or the like described above.

System Configuration, Etc.

The components of each device illustrated in the drawings are only for conceptually illustrating the functions thereof and are not necessarily physically configured as illustrated in the drawings. In other words, the specific shape of a separate or integrated device is not limited to the drawings; however, all or part of the device can be configured by functionally or physically separating or integrating any of the units depending on various loads or use conditions. For example, the internal line converting unit 210 illustrated in FIG. 4 can be integrated with the call processing unit 220 or the receiving unit 331 illustrated in FIG. 10 can also be integrated with the updating unit 332.

According to the communication system disclosed in the present invention, a mobile management apparatus can advantageously provide a supplementary service even when a mobile phone is in a call connection and is used as an internal phone.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
a mobile management apparatus that controls communication between mobile terminals; and
an internal line managing apparatus that controls communication, via the mobile management apparatus, between mobile terminals that are used as internal phones, wherein
the internal line managing apparatus includes
a user information storing unit that stores therein, in association with an internal phone number of a mobile terminal, call status information that indicates whether the mobile terminal is in a call connection, and providing-subject information that indicates which one of the internal line managing apparatus and the mobile management apparatus provides a supplementary service,
a call determining unit that determines, when an internal line call request is input with respect to a destination mobile terminal from a source mobile terminal, whether the destination mobile terminal is in a call connection in accordance with the call status information stored in the user information storing unit in association with the internal phone number of the destination mobile terminal,
an internal-line-party service providing unit that provides the supplementary service associated with the destination mobile terminal that is in the call connection,
a forwarding unit that forwards an internal line call request input to the mobile management apparatus, and
a providing-subject determining unit that determines, when an internal line call request is received, a providing subject of the supplementary service associated with the destination mobile terminal in accordance with the providing-subject information stored in the user information storing unit in association with the internal phone number of the destination mobile terminal and that outputs the internal line call request to the call determining unit when the providing subject of the supplementary service is the internal line managing apparatus, and that outputs the internal line call request to the forwarding unit when the providing subject of the supplementary service is the mobile management apparatus, and
the mobile management apparatus includes
a mobile-party service providing unit that provides, when the internal line call request is received from the forwarding unit, a supplementary service that is provided when a call request is received with respect to the destination mobile terminal that is in a call using the mobile phone number.

2. The communication system according to claim 1, wherein
the internal line managing apparatus further includes
a receiving unit that receives a subject information notification that includes an internal phone number of a mobile terminal and subject information that indicates, when the mobile terminal is in a call connection, which one of the internal line managing apparatus and the mobile management apparatus provides the supplementary service, and
an updating unit that updates the providing-subject information stored in the user information storing unit in association with the internal phone number included in the subject information notification received by the receiving unit to the subject information included in the subject information notification.

3. The communication system according to claim 2, wherein
the receiving unit determines, when a call connection request including an internal phone number is received, in accordance with an incoming call phone number included in the call connection request, whether the call connection request is the subject information notification, and
the updating unit updates, when the receiving unit determines that the call connection request is the subject information notification, the providing-subject information stored in the user information storing unit in association with the internal phone number included in the subject information notification to the subject information included in the subject information notification.

4. An internal line managing apparatus comprising:
a user information storing unit that stores therein, in association with an internal phone number of a mobile terminal, call status information that indicates whether the mobile terminal is in a call connection, and providing-subject information that indicates which one of the internal line managing apparatus and the mobile management apparatus provides a supplementary service, the mobile management apparatus controlling communication between mobile terminals;
a call determining unit that determines, when an internal line call request is input with respect to a destination mobile terminal from a source mobile terminal, whether the destination mobile terminal is in a call connection in accordance with the call status information stored in the user information storing unit in association with the internal phone number of the destination mobile terminal;
an internal-line-party service providing unit that provides the supplementary service associated with the destination mobile terminal that is in the call connection;
a forwarding unit that forwards an internal line call request input to the mobile management apparatus; and
a providing-subject determining unit that determines, when an internal line call request is received, a providing subject of the supplementary service associated with the destination mobile terminal in accordance with the providing-subject information stored in the user information storing unit in association with the internal phone number of the destination mobile terminal and that outputs the internal line call request to the call determining unit when the providing subject of the supplementary service is the internal line managing apparatus, and that outputs the internal line call request to the forwarding unit when the providing subject of the supplementary service is the mobile management apparatus.

5. An internal phone management method, comprising:
determining, when an internal line call request for communication using an internal phone number is received with respect to a destination mobile terminal from a source mobile terminal, a providing subject of the supplementary service associated with the destination mobile terminal in accordance with providing-subject information stored in a user information storing unit in association with the internal phone number of the destination mobile terminal, the user information storing unit storing therein, in association with the internal phone number of the destination mobile terminal, the providing-subject information that indicates which one of the internal line managing apparatus and a mobile management apparatus that controls communication between mobile terminals provides the supplementary service, and call status information that indicates whether the destination mobile terminal is in a call connection;

determining, when the providing subject of the supplementary service is the internal line managing apparatus, whether the destination mobile terminal is in a call connection in accordance with the call status information stored in the user information storing unit in association with the internal phone number of the destination mobile terminal;

providing, when the destination mobile terminal is in the call connection, the supplementary service associated with the destination mobile terminal; and forwarding, when the providing subject of the supplementary service is the mobile management apparatus, the internal line call request to the mobile management apparatus without determining whether the destination mobile terminal is in the call connection.

* * * * *